United States Patent
Yamamura et al.

(10) Patent No.: US 9,063,547 B2
(45) Date of Patent: Jun. 23, 2015

(54) CONTROL APPARATUS OF UNMANNED AUTONOMOUS OPERATING VEHICLE

(71) Applicant: HONDA MOTOR CO., LTD., Tokyo (JP)

(72) Inventors: Makoto Yamamura, Wako (JP); Toshiaki Kawakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 13/761,586

(22) Filed: Feb. 7, 2013

(65) Prior Publication Data

US 2013/0211646 A1    Aug. 15, 2013

(30) Foreign Application Priority Data

Feb. 10, 2012   (JP) .................................. 2012-027634

(51) Int. Cl.
*G05D 1/00* (2006.01)
*G05D 1/02* (2006.01)

(52) U.S. Cl.
CPC ............ *G05D 1/0225* (2013.01); *G05D 1/0265* (2013.01); *Y02T 10/7258* (2013.01)

(58) Field of Classification Search
CPC ............. G05D 1/0225; G05D 1/0265; G05D 2201/0208; G05D 1/0278; G05D 1/0287; G05D 1/0297; G05D 2201/0202; G05D 2201/0203; G05D 2201/021; G05D 2201/0215; A01D 34/008; A47L 2201/02; A47L 9/009; A47L 9/2805; A47L 9/2852; A47L 9/2873; A47L 9/2889; A47L 9/2894; B60W 2550/20; B60W 2550/30; B60W 2750/30; B60W 30/09; G01S 13/862; G01S 13/865; G01S 13/867; G01S 13/931; G01S 2013/9321; G01S 2013/9342; G01S 2013/9346; G01S 2013/935; G01S 2013/9353; G01S 2013/9364; G01S 2013/9367; G07C 3/00; G07C 5/085
USPC ....................... 701/23, 301; 320/109; 235/375
See application file for complete search history.

(56) References Cited

U.S. PATENT DOCUMENTS 8,433,468 B2 * 4/2013 Johnson et al. ................. 701/23
2001/0021888 A1 * 9/2001 Burns et al. ..................... 701/23

(Continued)

FOREIGN PATENT DOCUMENTS

| EP | 2413215 | 2/2012 |
|---|---|---|
| WO | 01/56362 | 8/2001 |
| WO | 2005/074362 | 8/2005 |

OTHER PUBLICATIONS

European Search Report dated Jul. 25, 2013, Application No. 13154132.8, 6 pages.

(Continued)

*Primary Examiner* — James Trammell
*Assistant Examiner* — Sanjeev Malhotra
(74) *Attorney, Agent, or Firm* — Rankin, Hill & Clark LLP (57) ABSTRACT

In an apparatus for controlling an unmanned autonomous operating vehicle having an electric motor supplied with power from a battery for operating lawn mower blades, and magnetic sensors for detecting intensity of a magnetic field of an area wire such that the vehicle is controlled to run about in an operating area defined by the area wire to mow lawn using the blades and to return to a charging device installed on the area wire so as to charge the battery, a distance from the area wire is detected based on the detected intensity of the magnetic field detected by the magnetic sensors, and a different one of returning trajectories defined along the area wire in advance with respect to distances from the area wire is selected, whenever the vehicle is to be returned.

14 Claims, 5 Drawing Sheets

(56) References Cited

U.S. PATENT DOCUMENTS

2003/0094922 A1* 5/2003 Petersson et al. ............. 320/109
2006/0293856 A1* 12/2006 Foessel et al. ................ 701/301
2007/0131754 A1* 6/2007 Brandon ....................... 235/375
2012/0029753 A1* 2/2012 Johnson et al. ................ 701/23

OTHER PUBLICATIONS

Korean Office Action with English Translation dated Jan. 27, 2014, 7 pages.

* cited by examiner

CONTROL APPARATUS OF UNMANNED AUTONOMOUS OPERATING VEHICLE

BACKGROUND

1. Technical Field

An embodiment of the invention relates to a control apparatus of an unmanned autonomous operating vehicle, particularly to an apparatus for controlling an operating vehicle to autonomously run about in an operating area to perform an operation using a mounted operating machine.

2. Background Art

Conventionally, there are proposed a variety of unmanned autonomous operating vehicles that autonomously run about in operating areas to perform operations using mounted operating machines (such as lawn-mowing blades), as taught, for example, by International Publication No. WO 2005/074362.

In the reference, a magnetic sensor attached to a front end of an operating vehicle detects the intensity of a magnetic field of an area wire laid along a border of an operating area to recognize the operating area, and a mounted operating machine including lawn-mowing blades and installed with an electric motor is driven to perform the operation in the recognized operating area.

The motor of the vehicle in the technique stated in the reference is supplied with power from a mounted battery. In order to charge the battery, a charging device is disposed on the area wire and when the remaining battery level is decreased, the vehicle is controlled to return to the charging device along the area wire by the aid of the magnetic sensor.

SUMMARY

The vehicle disclosed in the reference is configured to be returned to the charging device disposed on the area wire to charge the battery when the remaining battery level is decreased as mentioned above. Since the vehicle runs on a same trajectory or route whenever it is returned to the charging device, tracks or grooves are formed on the ground along the area wire by wheels of the vehicle and it may degrades the appearance of the operating area of after the operation, disadvantageously.

An object of an embodiment of the invention is therefore to overcome the foregoing drawback by providing a control apparatus of an unmanned autonomous operating vehicle having an electric motor supplied with power from a battery to drive an operating machine to perform an operation, which apparatus can avoid damaging the appearance of the ground of the operating area due to a trajectory in tracks or grooves formed when the vehicle is returned to a charging device to charge the battery.

In order to achieve the object, the embodiment of the invention provides in the first aspect an apparatus for controlling an unmanned autonomous operating vehicle having an electric motor supplied with power from a battery for operating an operating machine, prime movers for driving wheels, and magnetic sensors for detecting intensity of a magnetic field of an area wire, the vehicle being controlled to run about in an operating area defined by the area wire through wheels driven by the prime movers to perform an operation using the operating machine and to return to a charging device installed on the area wire so as to charge the battery, wherein the improvement comprises: an area wire distance detector adapted to detect a distance from the area wire based on the detected intensity of the magnetic field detected by the magnetic sensors; and a returning trajectory selector adapted to select a different one of a plurality of returning trajectories defined along the area wire in advance with respect to distances from the area wire, whenever the vehicle is to be returned to the charging device installed in the operating area to charge the battery.

In order to achieve the object, the embodiment of the invention provides in the second aspect a method for controlling an unmanned autonomous operating vehicle having an electric motor supplied with power from a battery for operating an operating machine, prime movers for driving wheels, and magnetic sensors for detecting intensity of a magnetic field of an area wire, the vehicle being controlled to run about in an operating area defined by the area wire through wheels driven by the prime movers to perform an operation using the operating machine and to return to a charging device installed on the area wire so as to charge the battery, wherein the improvement comprises the steps of: detecting a distance from the area wire based on the detected intensity of the magnetic field detected by the magnetic sensors; and selecting a different one of a plurality of returning trajectories defined along the area wire in advance with respect to distances from the area wire, whenever the vehicle is to be returned to the charging device installed in the operating area to charge the battery.

BRIEF DESCRIPTION OF DRAWINGS

The above and other objects and advantages will be more apparent from the following description and drawings in which.

DESCRIPTION OF EMBODIMENT

A control apparatus of an unmanned autonomous operating vehicle according to an embodiment of the present invention will now be explained with reference to the attached drawings.

Figure 1:
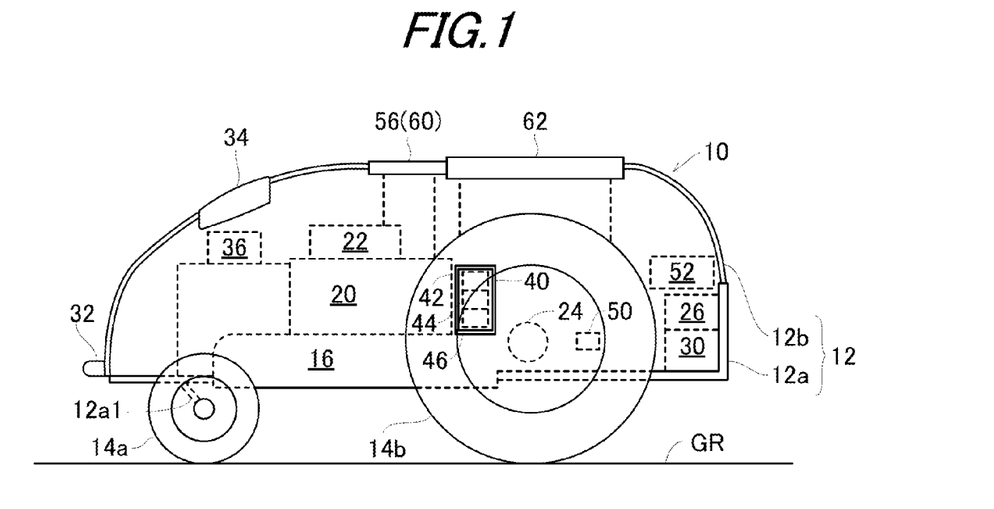
FIG. 1 is a side view of a control apparatus of an unmanned autonomous operating vehicle according to an embodiment of the invention.
Figure 2:
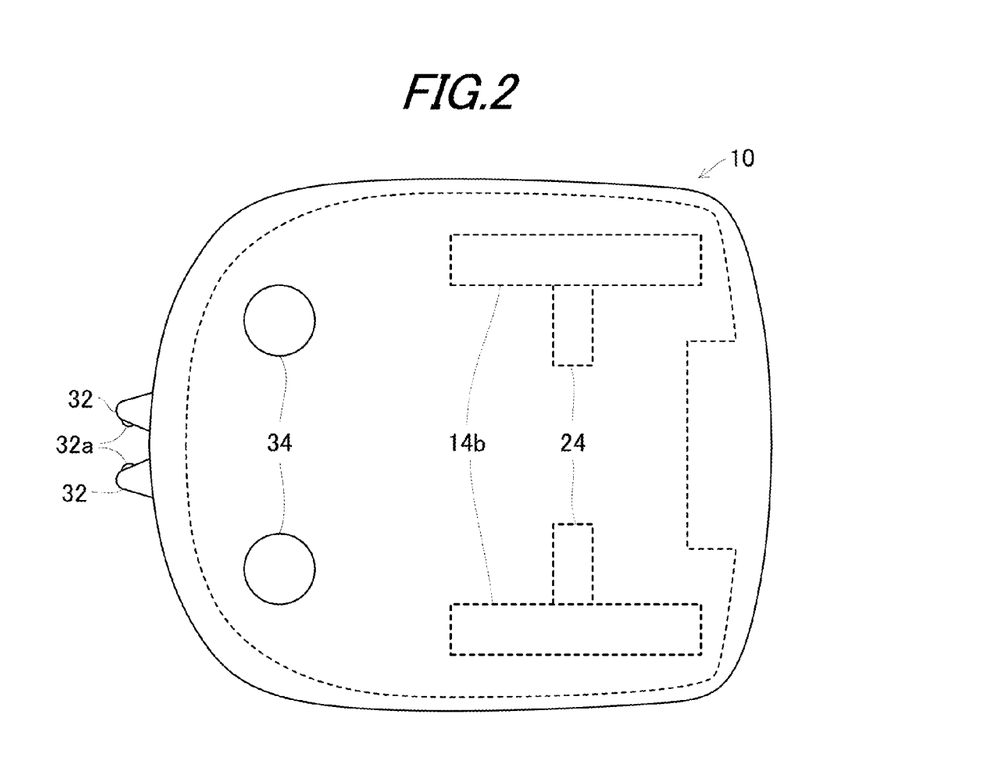
FIG. 2 is a plan view of the vehicle shown in FIG. 1.
Figure 3:
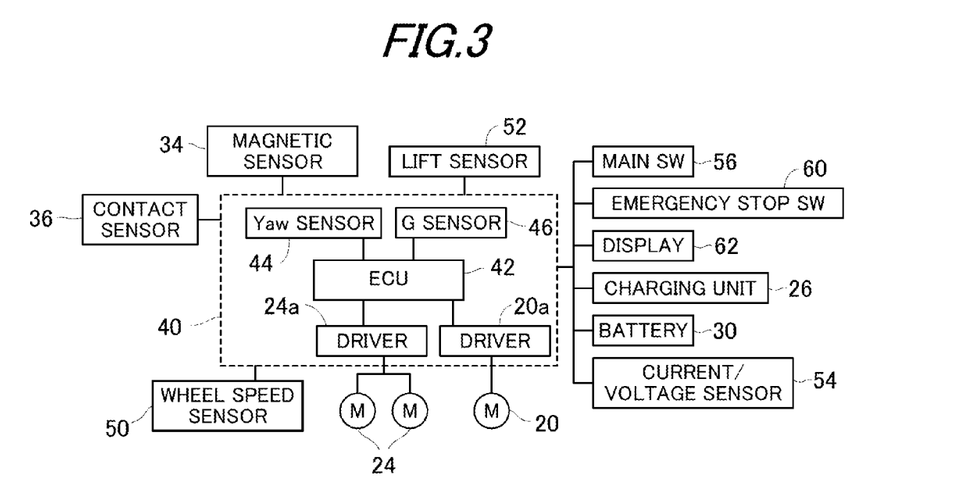
FIG. 3 is a block diagram showing input and output of devices mounted on the vehicle shown in FIG. 1.
Figure 4:
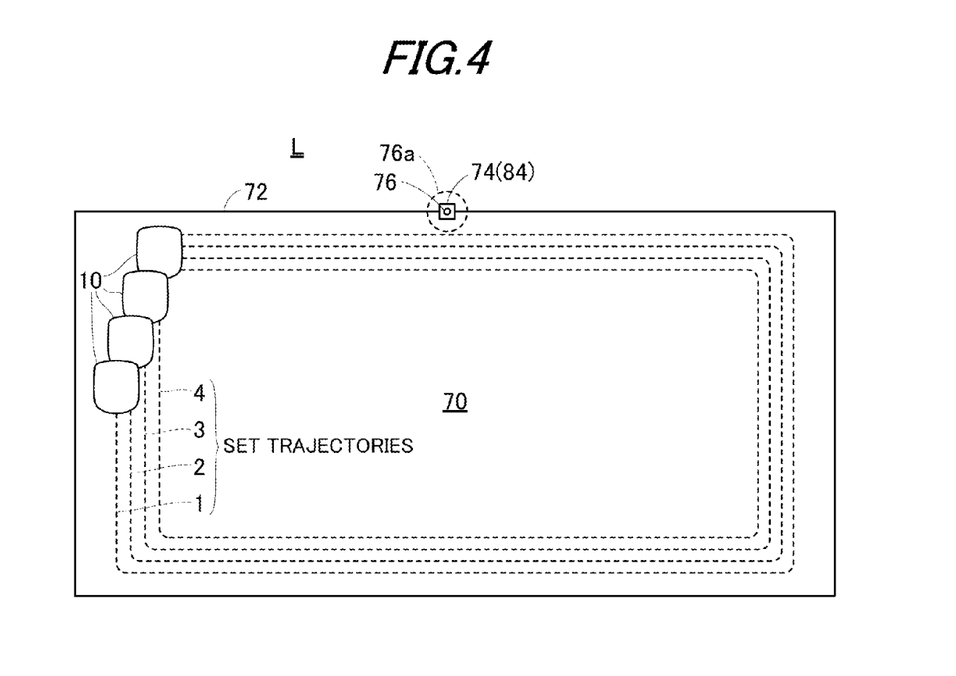
FIG. 4 is a plan view showing an operating area where the vehicle shown in FIG. 1 is to run about.

FIG. 1 is a side view of a control apparatus of an unmanned autonomous operating vehicle according to an embodiment of the invention, FIG. 2 is a plan view of the vehicle shown in FIG. 1, FIG. 3 is a block diagram showing input and output of devices mounted on the vehicle shown in FIG. 1 and FIG. 4 is a plan view showing an operating area where the vehicle shown in FIG. 1 is to run about.

As shown in FIGS. 1 and 2, symbol 10 indicates an unmanned autonomous operating vehicle. The vehicle 10 has a vehicle body 12 and wheels 14. The body 12 includes a chassis 12a and a frame 12b attached to the chassis 12a, while the wheels 14 include right and left front wheels 14a of a relatively small diameter that are fixed on the forepart of the chassis 12a through a stay 12a1, and right and left rear wheels 14b of a relatively large diameter that are directly attached to the chassis 12a.

Blades (rotary blades; operating machine) 16 for mowing lawn are attached in the center or thereabout of the chassis 12a, and an electric motor (hereinafter called the "operating motor") 20 is installed above the blades 16. The blades 16 are connected to the operating motor 20 to be driven and rotated thereby.

The blades 16 are also connected to a blade height adjustment mechanism 22 to be manually manipulated by an operator (user). The blade height adjustment mechanism 22 is equipped with a screw (not shown) to be manually turned by the operator for adjusting the height of the blades 16 from a contacting ground GR.

Two electric motors (prime movers; hereinafter called the "running motors") 24 are attached to the chassis 12a of the vehicle 10 to the rear of the blades 16. The running motors 24 are connected to the right and left rear wheels 14b to operate them so that the rear wheels 14b are rotated in the normal (forward running) direction or reverse (backward running) direction independently of each other to make the vehicle 10 to run on the ground GR. In other words, the front wheels 14a serve as the free wheels while the rear wheels 14b serve as the driven wheels. The blades 16, operating motor 20, running motors 24, etc., are covered by the frame 12b.

A charging unit (including an AC/DC converter) 26 and battery 30 are accommodated at the rear of the vehicle 10 and two charging terminals 32 are attached at the front of the vehicle 10 to the frame 12b to protrude forward. Each of the terminals 32 has a contact point 32a on a side facing the other contact point 32a.

The terminals 32 are connected to the charging unit 26 through wiring and the charging unit 26 is connected to the battery 30 through wiring. The operating and running motors 20, 24 are connected to the battery 30 through wiring to be supplied with power therefrom. The wiring is not illustrated in FIGS. 1 and 2.

Thus, the vehicle 10 is constituted as a four-wheel, unmanned, electric autonomous operating vehicle (lawn-mowing vehicle) that is, for instance, about 600 millimeters long, 300 millimeters wide and 300 millimeters high.

A front end of the vehicle 10 is installed with two, i.e., right and left magnetic sensors (magnetism detector) 34. The frame 12b is attached with a contact sensor 36. When the frame 12b comes off from the chassis 12a upon having contact with an obstacle and such, the contact sensor 36 outputs an ON signal.

A housing box is provided in the center or thereabout of the vehicle 10 to house a board 40 on which an Electronic Control Unit (ECU; Controller) 42 including a microcomputer having a CPU, ROM, RAM, etc., is installed. The board 40 is also installed in the vicinity of the ECU 42 with a Yaw sensor (angular velocity sensor) 44 that produces an output or signal indicative of angular velocity (yaw rate) generated about a z-axis in the center of gravity of the vehicle 10 and with a G sensor (acceleration sensor) 46 that produces an output or signal indicative of an acceleration G acting on the vehicle 10 in the X, Y and Z (three-axis) directions.

A wheel speed sensor 50 is installed near the rear (driven) wheel 14b to produce an output or signal representing a wheel speed thereof. A lift sensor 52 is installed between the chassis 12a and frame 12b to output an ON signal when the frame 12b is lifted from the chassis 12a by the operator or the like.

A current/voltage sensor 54 is installed at the battery 30 to produce an output or signal indicative of SOC (State Of Charge) of the battery 30. The vehicle 10 is installed with a main switch 56 and emergency stop switch 60 to be manipulated by the operator.

The outputs of the foregoing magnetic sensors 34, contact sensor 36, Yaw sensor 44, G sensor 46, wheel speed sensor 50, lift sensor 52, current/voltage sensor 54, main switch 56 and emergency stop switch 60 are sent to the ECU 42.

The upper surface of the frame 12b of the vehicle 10 is widely cut away and a display 62 is installed therein. The display 62 is connected to the ECU 42 to show a mode of the vehicle's status such as an operating mode in response to a command sent from the ECU 42.

Next, the explanation will be made on the operating area 70 where the vehicle 10 is to run about. As shown in FIG. 4, the operating area 70 has a substantially-rectangular shape and is defined by an area wire (electric wire) 72 that is embedded (laid) along a border of land L. A charge ST (station) 74 is provided on the area wire 72. Note that the vehicle 10 in FIG. 4 is exaggerated in size.

The charge ST (charging device) 74 is disposed with an ST coil 76. A magnetic field radiated from the ST coil 76 forms a charging device detecting area 76a of a circle with center at the charge ST 74 with a radius of about one meter. Thus, the charge ST (charging device) 74 is disposed with the coil 76 radiating a magnetic field that forms the charging device detecting area 76a around the charge ST 74.

Figure 5:
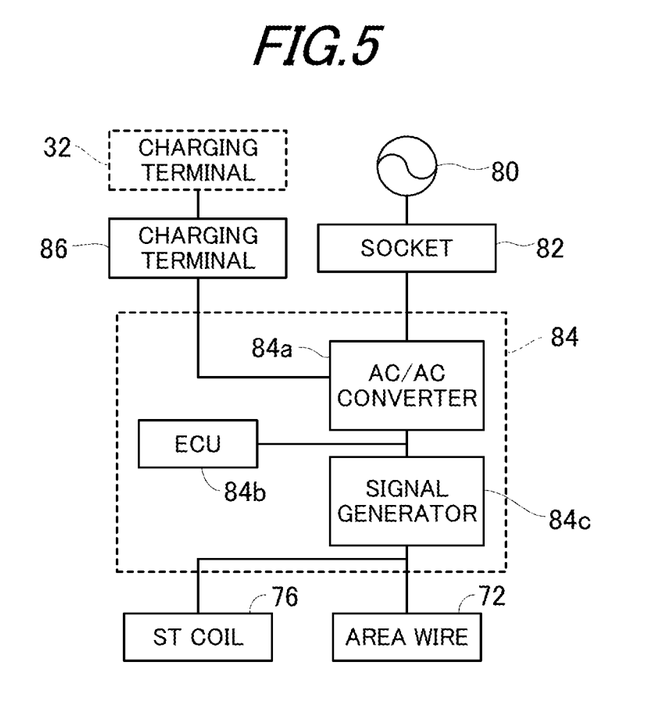
FIG. 5 is a block diagram showing the configuration of the charge ST (station) shown in FIG. 4.
Figure 6:
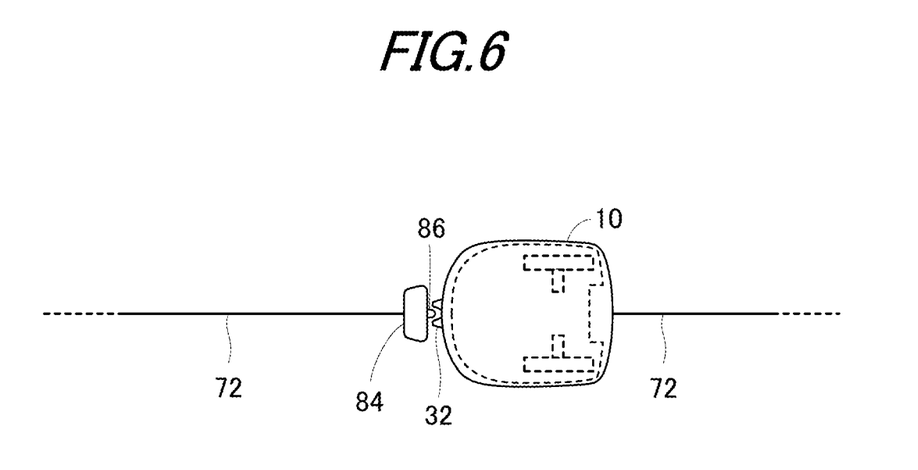
FIG. 6 is an explanatory view showing a charging process at the charge ST shown in FIG. 5.

As shown in FIG. 5, the charge ST 74 has a charging device 84 connected to a commercial power source 80 through a socket 82, and a charging terminal 86 that is connected to the charging device 84 and connectable to the contact points 32a of the charging terminals 32 of the vehicle 10 through its contact points. The charging terminal 86 is shown in FIG. 6 (the contact points thereof are not illustrated).

The charging device 84 has an AC/AC converter 84a, an Electronic Control Unit (ECU) 84b that includes a microcomputer similarly to the ECU 42 and controls the operation of the AC/AC converter 84a, and a signal generator 84c that supplies alternating current to the area wire 72 and ST coil 76 to generate signals.

Alternating current coming from the commercial power source 80 through the socket 82 is appropriately stepped down by the AC/AC converter 84a of the charging device 84 and, when the vehicle 10 is returned and connected to the charge ST 74 through the charging terminals 32 and 86, the current is sent to the vehicle 10 to charge the battery 30 through the charging unit 26.

The operation of detecting the operating area 70 will be explained. Upon power supply from the signal generator 84c, a magnetic field is generated around the area wire 72. The intensity of the magnetic field varies depending on the entire length of the area wire 72 and also varies depending on a distance d from the area wire 72 as shown in FIG. 7.

The intensity of the magnetic field of the area wire 72 is detected by the magnetic sensors 34 attached to the vehicle 10 and sent to the ECU 42. Based on the detected values, the ECU 42 detects a position of the subject vehicle (autonomous operating vehicle 10) with respect to the area wire 72 (i.e., whether the subject vehicle is positioned inside or outside the operating area 70) and the distance of the subject vehicle from the area wire 72 (i.e., from the border of the operating area 70).

Figure 7:
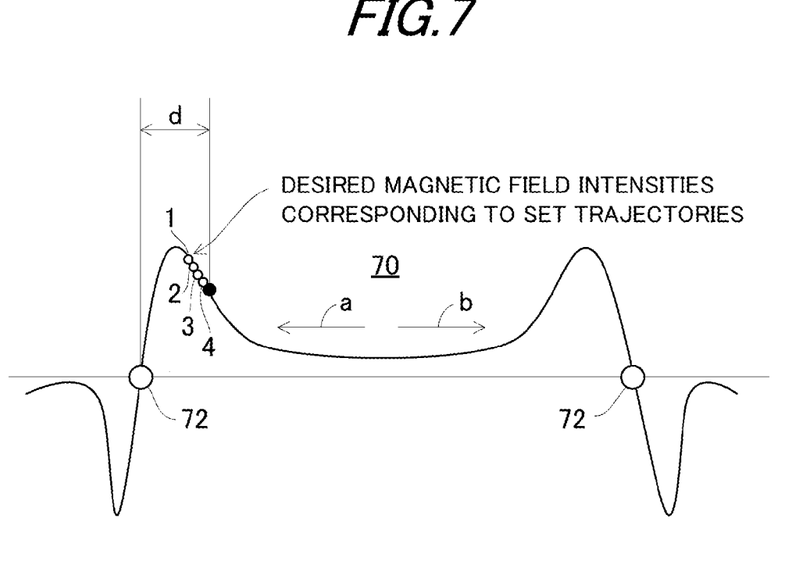
FIG. 7 is an explanatory view showing a magnetic field of an area wire embedded in the operating area shown in FIG. 4.

More specifically, as shown in FIG. 7, when the subject vehicle is moved from the inside of the operating area 70 to the outside thereof in a direction indicated by an arrow a, as the distance from the area wire 72 is reduced (as the subject vehicle is moved closer to the area wire 72), the intensity of the magnetic field is gradually increased on a positive side and afterward, decreased. When the subject vehicle is positioned on the area wire 72, the intensity becomes zero. Subsequently, when the distance from the area wire 72 is again increased, the intensity exhibits the similar characteristics on a negative side. Also when the subject vehicle is moved from the inside of the operating area 70 to the outside thereof in a direction indicated by an arrow b, the characteristics similar to the above pattern are exhibited.

The operation of the vehicle 10 will be explained. The height of the blades 16 is manually adjusted by the operator through the blade height adjustment mechanism 22 in accordance with a growing condition of the lawn in the operating area 70. When the main switch 56 is switched on so that the ON signal is outputted, the ECU 42 starts to be operated and enters the operating mode to mow the lawn.

In the operating mode, the ECU 42 calculates a power supply control value with which a vehicle speed detected from the output of the wheel speed sensor 50 becomes a predetermined value and supplies the calculated value to the running motors 24 through a driver 24a to make the vehicle 10 run about. Further, the ECU 42 calculates a power supply control value with which rotational speeds of the blades 16 become a predetermined value and supplies the calculated value to the operating motor 20 through a driver 20a to operate the blades 16 to perform the operation.

To be more specific, in the operating mode, the ECU 42 makes the vehicle 10 run about randomly (or in accordance with an operation pattern) to perform the operation within the operating area 70. When determining that the vehicle 10 has moved out of the operating area 70 based on the outputs of the magnetic sensors 34, the ECU 42 changes a running direction detected based on the output of the Yaw sensor 44 by a predetermined angle so that the vehicle 10 comes back to the inside of the operating area 70.

Since the right and left rear (driven) wheels 14b are configured so that they are driven by the running motors 24 to rotate in the normal and reverse directions independently or separately from each other, when the motors 24 are rotated in the normal direction at the same speed, the vehicle 10 runs straight, whilst when they are rotated in the normal direction at different speeds, the vehicle 10 is turned toward a side of lower rotational speed. When one of the motors 24 is rotated in the normal direction and the other is rotated in the reverse direction, since the rear wheels 14b are rotated in the same direction as the associated motor's rotation, the vehicle 10 is turned at the same position (which is so-called pivot turn).

Thus, in the operating mode, the ECU 42 makes the vehicle 10 run about within the operating area 70 while changing the running direction thereof randomly whenever the vehicle 10 reaches the area wire 72, and drives the blades 16 to perform the operation.

Further, in the operating mode, the ECU 42 monitors the SOC of the battery 30 based on the output of the current/voltage sensor 54 and when the remaining battery level is decreased to a predetermined level, transitions to a return mode in which the vehicle 10 is returned to the charge ST 74 to charge the battery 30 by the charging device 84.

In the operating mode and return mode, when any of the contact sensor 36, lift sensor 52 and emergency stop switch 60 produces the ON signal, the ECU 42 stops the operating and running motors 20, 24 to stop the operation and running of the vehicle 10.

Figure 8:
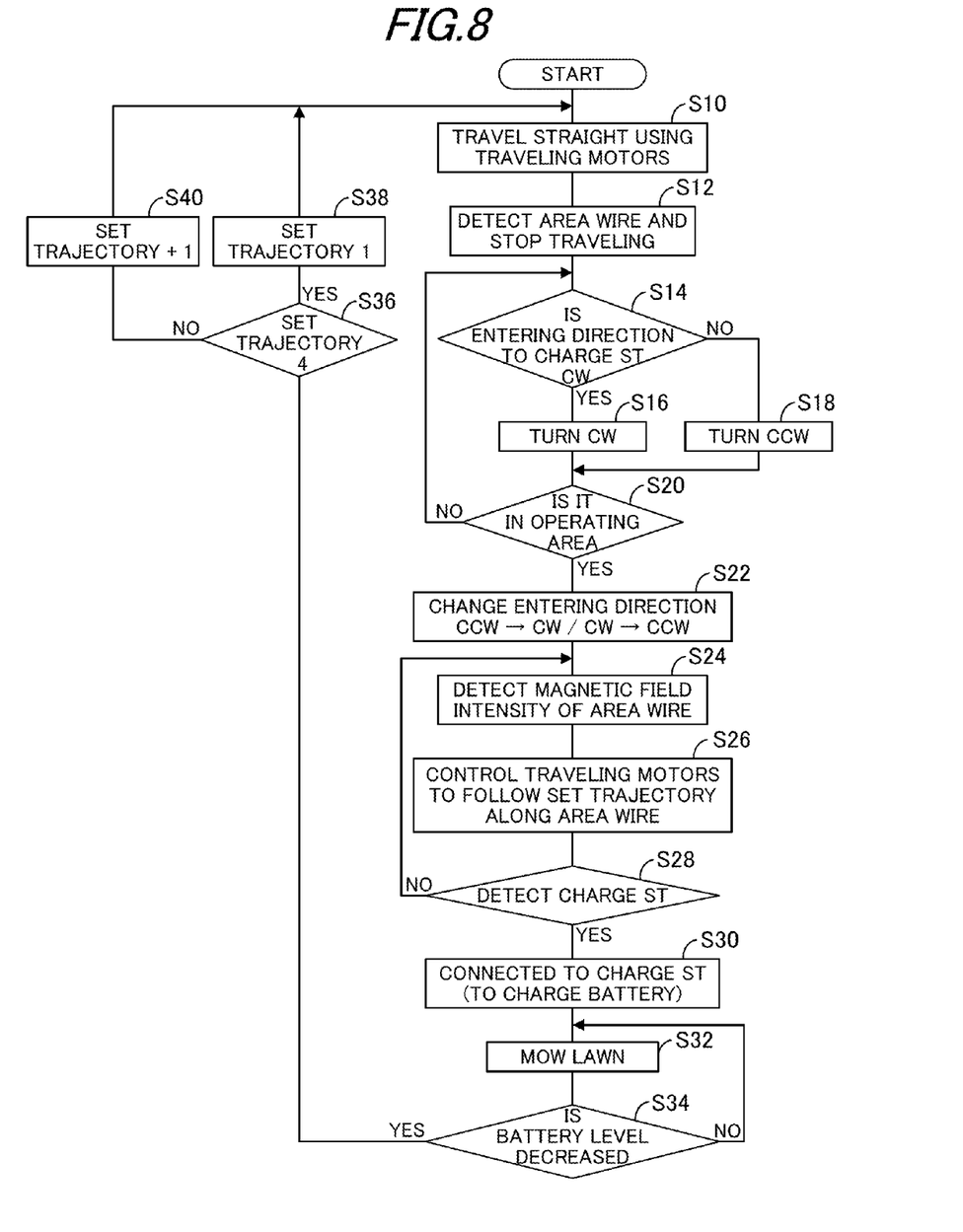
FIG. 8 is a flowchart showing the operation of the apparatus shown in FIG. 1.

FIG. 8 is a flowchart showing the operation of the ECU 42 in the return mode.

First, trajectories (returning trajectories) to be used in the processes of the FIG. 8 flowchart are explained with reference to FIGS. 4 and 7. In the embodiment, as illustrated, based on the distance from the area wire 72 (more exactly, in decreasing order of the distance), a plurality of, e.g., four trajectories 1, 2, 3, 4 set (defined) in advance and stored in the ROM of the ECU 42.

To be more specific, as shown in FIGS. 4 and 7, the set trajectories 1, 2, 3, 4 are respectively linked with four values of intensities obtained by dividing into quarters an intensity of the magnetic field of a certain distance range d, in increasing order of the intensity (i.e., in ascending order of the corresponding distance). The set trajectory 4 away from the area wire 72 the most is arranged so that it is, for example, one meter away from the area wire 72 with taking the radius of the charging device detecting area 76a into account.

In the processes in the FIG. 8 flowchart, the vehicle 10 is controlled to follow different one of the set trajectories whenever it is to be returned to the charge ST 74. Specifically, it is configured to select one of the set trajectories in order of 4, 1, 2, 3, 4, . . . , and the selecting operation is carried out by referring to a counter prepared in the RAM and retrieving a suitable one from data in the ROM or through other method.

More specifically, it is configured so that the set trajectories 1, 2, 3, 4 are positioned away from the area wire 72 by different distances and one of the set trajectories is selected such that the distance from the area wire 72 increases (than one time before) whenever the vehicle 10 is returned to the charge ST 74.

Further, it is configured so that an entering direction of the vehicle 10 to the charge ST 74 is alternately changed between a CW (Clockwise) and CCW (Counterclockwise), as viewed from above of the operating area 70 (shown in FIG. 4), whenever the vehicle 10 is to be returned. It is carried out by setting an appropriate flag in the RAM of the ECU 42.

Based on the above configuration, the explanation on the FIG. 8 flowchart will be made. This program begins when the vehicle 10 is to be returned to charge the battery 30. First, the running motors 24 are operated to make the vehicle 10 run straight (S10), the area wire 72 is detected based on the outputs of the magnetic sensors 34, and the vehicle 10 is moved out of the operating area 70 and stopped (S12).

Next, it is determined whether the entering direction of the vehicle 10 when it is returned to the charge ST 74 is set as the CW (S14). When the result in S14 is affirmative, the vehicle 10 is restarted to run while turning (if necessary) so that it can enter the charge ST 74 in clockwise (CW) direction (S16), while when the result is negative, the vehicle 10 is turned (if necessary) so that it can enter the charge ST 74 in counterclockwise (CCW) direction (S18) and the above process is repeated until it is confirmed that the vehicle 10 has come inside the operating area 70 (S20). Then, the entering direction is changed between the CW and CCW for the next returning operation (S22).

Subsequently, the intensity of the magnetic field of the area wire 72 is detected based on the outputs of the magnetic sensors 34 (S24) and based on the detected intensity, the operation of the running motors 24 are controlled to make the vehicle 10 follow one of the set trajectories along the area wire 72 (S26).

Specifically, based on the outputs of the magnetic sensors 34, the ECU 42 controls amounts of power to be supplied to the running motors 24 using a feedback control law such as a proportional term so as to make the vehicle 10 follow one of the set trajectories 1 to 4 along the area wire 72.

More specifically, the ECU 42 detects a difference (error) between a desired magnetic field intensity expected with a selected one of the set trajectories and the actual magnetic field intensity detected by the magnetic sensors 34 and calculates the power supply control values to be sent to the running motors 24 using the proportional term of the feedback control so that the detected difference decreases. That is, based on the outputs of the magnetic sensors 34, the ECU 42 controls amounts of power to be supplied to the running motors 24 using a feedback control law such as a proportional term so that a front portion of the vehicle 10 is slightly shaken right and left to be positioned inside and outside the operating area 70 alternately, thereby controlling the vehicle 10 to run on or along the area wire 72.

In other words, the ECU 42 detects the distance of the vehicle 10 from the area wire 72 based on the detected intensity of the magnetic field, calculates a difference between the detected distance and a defined distance of the selected one of the set trajectories, and calculates the power supply control values to be sent to the running motors 24 using the feedback control law so that the calculated difference is decreased.

Next, it is determined whether the charge ST 74, i.e., the charging device detecting area 76a is detected by monitoring a low intensity magnetic field generated from the ST coil 76 using the magnetic sensors 34 and comparing it with an appropriate threshold value (S28). Whenever the result in S28 is negative, the program returns to S24 to repeat the foregoing process.

When the result in S28 is affirmative, the ECU 42 detects the area wire 72 by turning for example the vehicle 10 and controls the vehicle 10 to run along the area wire 72 while decreasing the running speed to enter the charge ST 74 (in the CW or CCW direction), whereby the charging terminals 32 of the vehicle 10 are connected to the charging terminal 86 to charge the battery 30 (S30).

Next, the charged vehicle 10 is back to the operation and runs about randomly in the operating area 70 and the blades 16 are driven by the operating motor 20 to mow the lawn (S32). It is determined whether the remaining battery level of the battery 30 is decreased (i.e., becomes equal to or less than the predetermined level) (S34) and until the remaining battery level is determined to have been decreased, the program repeatedly returns to S32 to continue the mowing operation.

When the remaining battery level is determined to have been decreased in S34, the vehicle 10 is returned to the charge ST 74. As explained in the foregoing, since one of the set trajectories (returning trajectories) is selected in order of 4, 1, 2, 3, 4, . . . , it is determined whether the currently-selected set trajectory is 4 (S36) and when the result is affirmative, the set trajectory 1 is selected (S38).

When the result in S36 is negative, the number of the set trajectory is incremented by one (S40). For instance, in the case where the currently-selected set trajectory is 2, it leads to the equation of 2+1=3 so that the set trajectory 3 is selected. Subsequently, the program returns to S10.

Note that, when (it is determined that) the vehicle 10 has been moved out of the operating area 70 during running along the set trajectory 3 for example, the ECU 42 determines that the set trajectory the vehicle 10 should go back is the set trajectory 2 positioned on the inner side of the set trajectory 3. Or, when (it is determined that) the vehicle 10 has been moved out during running along the set trajectory 2, the ECU 42 determines that the set trajectory the vehicle 10 should go back is the set trajectory 1 positioned on the inner side of the set trajectory 2.

Thus, since it is configured so that the different trajectory is selected whenever the vehicle 10 is returned, it becomes possible to prevent tracks or grooves from being formed on the area wire 72 by wheels 14 and therefore, avoid damaging the appearance of the operating area 70 of after the mowing operation. Further, it becomes possible to reliably run about the vehicle 10 within the operating area 70.

As stated above, the embodiment is configured to have an apparatus (and method) for controlling an unmanned autonomous operating vehicle (10) having an electric motor (20) supplied with power from a battery (30) for operating an operating machine (16), prime movers (24) for driving wheels (14), and magnetic sensors (34) for detecting intensity of a magnetic field of an area wire (72), the vehicle being controlled to run about in an operating area (70) defined by the area wire through wheels driven by the prime movers to perform an operation using the operating machine and to return to a charging device (charge ST 74, charging device 84) installed on the area wire so as to charge the battery, characterized in that: an area wire distance detector (42, S10-S24) adapted to detect a distance from the area wire based on the detected intensity of the magnetic field detected by the magnetic sensors; and a returning trajectory selector (42, S28-S40) adapted to select a different one of a plurality of returning trajectories defined along the area wire in advance with respect to distances from the area wire, whenever the vehicle is to be returned to the charging device installed in the operating area to charge the battery.

With this, since the trajectory to follow is changed every time the remaining battery level is decreased and the vehicle 10 is returned to the charging device 84, it becomes possible to prevent tracks or grooves from being formed on the area wire 72 by wheels 14 and therefore, avoid damaging the appearance of the operating area 70. Further, since it suffices to modify only the control and another device is not necessary, the structure can be simple.

In the apparatus (and method), the returning trajectories are set to be different from distances away from the area wire and one of the returning trajectories is selected such that the distance from the area wire increases whenever the vehicle is to be returned (S36-S40). With this, in addition to the above effects, it becomes possible to change the trajectory to follow more efficiently.

In the apparatus (and method), the returning trajectory selector changes an entering direction of the vehicle to the charging device whenever the vehicle is to be returned. With this, in addition to the above effects, it becomes possible to change the trajectory to follow more efficiently.

In the apparatus (and method), the charging device is disposed with a coil (ST coil 76) radiating a magnetic field that forms a charging device detecting area 76a around the charging device. With this, it becomes possible to detect the charging device more easily.

In the apparatus (and method), the returning trajectory selector selects one of the trajectories positioned on the inner side when the vehicle has been moved out of the operating area during returning to the charging device. With this, in addition to the above effects, it becomes possible to change the trajectory to follow more efficiently.

In the apparatus (and method), the prime movers (24) comprise electric motors to be supplied with power from the battery. With this, in addition to the above effects, it becomes possible to reduce the noise compared to a case that an engine is employed.

In the apparatus (and method), the operating machine (16) comprises a lawn mower. With this, in addition to the above effects, in the mowing operation in which the operating area 70 is required to have the good appearance after the operation, it becomes possible to avoid damaging the appearance and also avoid needlessly damaging the lawn.

It should be noted that, in the foregoing, although the electric motor is applied as the prime mover, it may be an internal combustion engine or a hybrid of an engine and electric motor.

It should also be noted that, although the lawn-mowing blades are exemplified as the operating machine, but it should not be limited thereto and any machine can be applied if it is used for maintaining the appearance of the operating area.

Japanese Patent Application No. 2012-027634, filed on Feb. 10, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an unmanned autonomous operating vehicle having an electric motor supplied with power from a battery for operating an operating machine, prime movers for driving wheels, and magnetic sensors for detecting intensity of a magnetic field of an area wire, the unmanned autonomous operating vehicle being controlled in an operating mode, to run about in an operating area defined by the area wire through wheels driven by the prime movers to perform an operation using the operating machine and in a return mode, to return to a charging device installed on the area wire so as to charge the battery, wherein the apparatus comprises:
a distance detector adapted to detect a distance from the area wire based on the intensity of the magnetic field detected by the magnetic sensors;
a memory adapted to store a plurality of returning trajectories set along the area wire in the operating area in advance, distances from the area wire to the plurality of returning trajectories being different from each other;
a returning trajectory selector adapted to select one of the plurality of returning trajectories stored in the memory each time a control mode of the unmanned autonomous operating vehicle is changed from the operating mode to the return mode; and
a running controller adapted to control the prime mover so that the unmanned autonomous operating vehicle runs along the returning trajectory selected by the returning trajectory selector,
wherein the returning trajectory selector selects one of the plurality of returning trajectories such that a distance from the area wire to the returning trajectory increases each time the control mode is changed from the operating mode to the return mode.

2. The apparatus according to claim 1, wherein the returning trajectory selector changes an entering direction of the unmanned autonomous operating vehicle to the charging device each time the control mode is changed from the operating mode to the return mode.

3. The apparatus according to claim 1, wherein the charging device is disposed with a coil radiating a magnetic field that forms a charging device detecting area around the charging device.

4. The apparatus according to claim 1, wherein the returning trajectory selector selects one of the trajectories positioned on the inner side when the unmanned autonomous operating vehicle has been moved out of the operating area during returning to the charging device.

5. The apparatus according to claim 1, wherein the prime movers comprise electric motors to be supplied with power from the battery.

6. The apparatus according to claim 1, wherein the operating machine comprises a lawn mower.

7. The apparatus according to claim 1, wherein the plurality of returning trajectories include a first returning trajectory, a second returning trajectory inside the first returning trajectory, and a third returning trajectory inside the second returning trajectory, and wherein the first returning trajectory, the second returning trajectory, and the third returning trajectory are set so that a difference between the intensity of the magnetic field at the first returning trajectory and the intensity of the magnetic field at the second returning trajectory is equal to a difference between the intensity of the magnetic field at the second returning trajectory and the intensity of the magnetic field at the third returning trajectory.

8. A method for controlling an unmanned autonomous operating vehicle having an electric motor supplied with power from a battery for operating an operating machine, prime movers for driving wheels, and magnetic sensors for detecting intensity of a magnetic field of an area wire, the unmanned autonomous operating vehicle being controlled in an operating mode, to run about in an operating area defined by the area wire through wheels driven by the prime movers to perform an operation using the operating machine and in a return mode, to return to a charging device installed on the area wire so as to charge the battery, wherein the method comprises:
detecting a distance from the area wire based on the intensity of the magnetic field detected by the magnetic sensors;
storing a plurality of returning trajectories set along the area wire in the operating area in advance, distances from the area wire to the plurality of returning trajectories being different from each other;
selecting one of the plurality of returning trajectories stored in advance each time a control mode of the unmanned autonomous operating vehicle is changed from the operating mode to the return mode; and
controlling the prime mover so that the unmanned autonomous operating vehicle runs along the selected returning trajectory,
wherein the selecting includes selecting one of the plurality of returning trajectories such that a distance from the area wire to the returning trajectory increases each time the control mode is changed from the operating mode to the return mode.

9. The method according to claim 8, wherein the selecting includes changing an entering direction of the unmanned autonomous operating vehicle to the charging device each time the control mode is changed from the operating mode to the return mode.

10. The method according to claim 8, wherein the charging device is disposed with a coil radiating a magnetic field that forms a charging device detecting area around the charging device.

11. The method according to claim 8, wherein the returning trajectory selector selects one of the trajectories positioned on the inner side when the unmanned autonomous operating vehicle has been moved out of the operating area during returning to the charging device.

12. The method according to claim 8, wherein the prime movers comprise electric motors to be supplied with power from the battery.

13. The method according to claim 8, wherein the operating machine comprises a lawn mower.

14. The method according to claim 8, wherein the plurality of returning trajectories include a first returning trajectory, a second returning trajectory inside the first returning trajectory, and a third returning trajectory inside the second returning trajectory, and wherein the first returning trajectory, the second returning trajectory, and the third returning trajectory are set so that a difference between the intensity of the magnetic field at the first returning trajectory and the intensity of the magnetic field at the second returning trajectory is equal to a difference between the intensity of the magnetic field at the second returning trajectory and the intensity of the magnetic field at the third returning trajectory.

* * * * *